United States Patent [19]
Shores

[11] 3,949,400
[45] Apr. 6, 1976

[54] POSITION DETERMINATION SYSTEMS

[75] Inventor: Paul W. Shores, Houston, Tex.

[73] Assignee: The United States of America as represented by the Administrator of the National Aeronautics and Space Administration, Washington, D.C.

[22] Filed: Nov. 28, 1973

[21] Appl. No.: 419,747

[52] U.S. Cl. ........ 343/100 ST; 325/14; 343/100 SA; 343/112 TC
[51] Int. Cl.$^2$ ............................................. H04B 7/19
[58] Field of Search .... 343/100 ST, 100 SA, 112 R, 343/112 TC; 325/14

[56] References Cited
UNITED STATES PATENTS

| | | | |
|---|---|---|---|
| 3,351,942 | 11/1967 | Sodano | 343/112 R |
| 3,500,411 | 3/1970 | Kiesling | 343/100 ST |
| 3,678,387 | 7/1972 | Wilson | 325/14 |
| 3,710,255 | 1/1973 | Gicca | 343/100 ST |

OTHER PUBLICATIONS
"Navigation," Vol. 17, No. 3, Autumn 1964, pp. 335–341 by E. S. Keats.

*Primary Examiner*—T. H. Tubbesing
*Assistant Examiner*—Richard E. Berger
*Attorney, Agent, or Firm*—Carl O. McClenny; John R. Manning; Marvin F. Matthews

[57] ABSTRACT

Disclosed is a system for an orbital antenna means which is operated at a synchronous altitude to scan an area of a celestial body. The antenna means comprises modules which are operated by a steering signal in a repetitive function for providing a scanning beam over the area. The scanning covers the entire area in a pattern and the azimuth of the scanning beam is transmitted to a control station on the celestial body simultaneous with signals from an activated ground beacon on the celestial body. The azimuth of the control station relative to the antenna means is known and the location of the ground beacon is readily determined from the azimuth determinations.

2 Claims, 7 Drawing Figures

U.S. Patent  April 6, 1976  Sheet 1 of 2  3,949,400
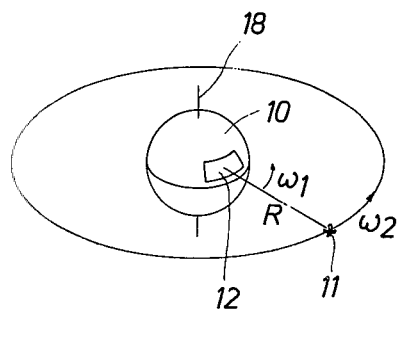
FIG. 1
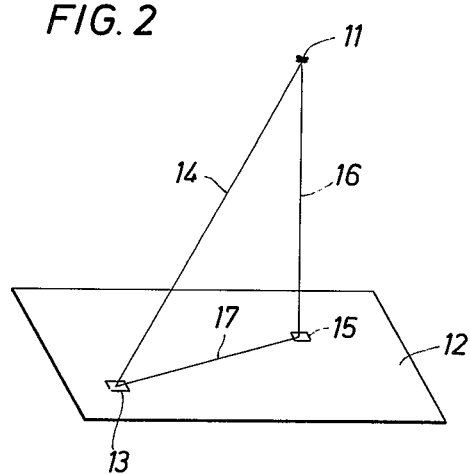
FIG. 2
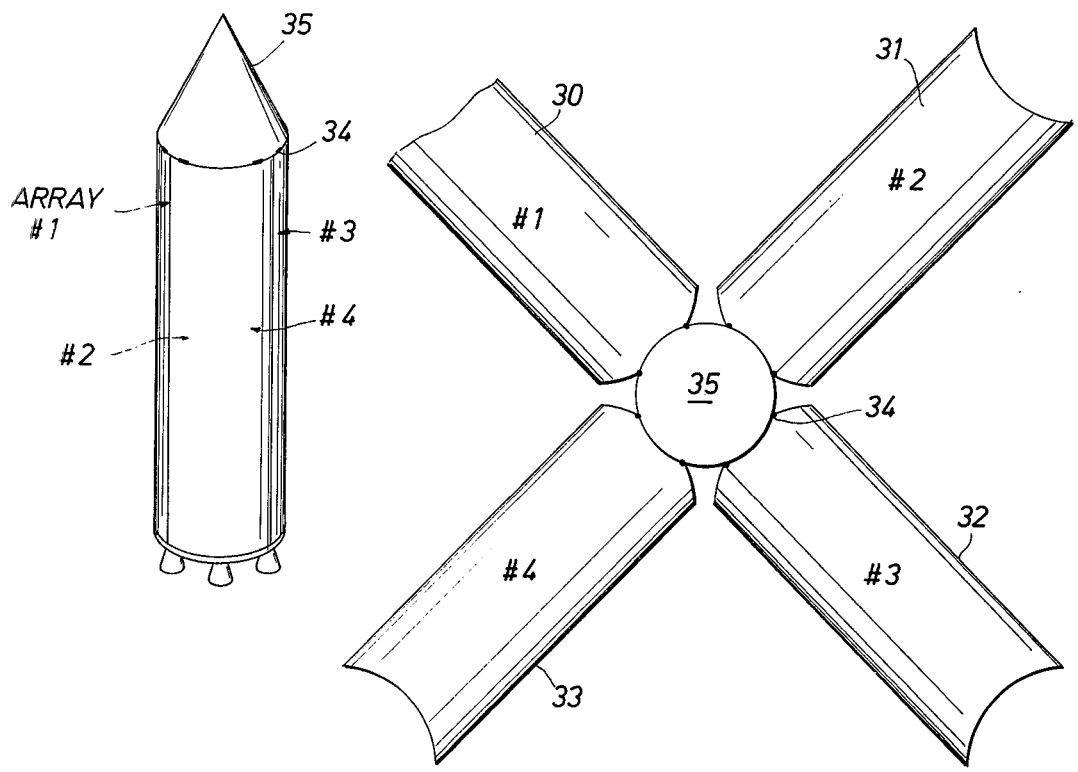
FIG. 4
FIG. 5

POSITION DETERMINATION SYSTEMS

ORIGIN OF THE INVENTION

The invention described herein was made by an employee of the United States and may be manufactured and used by or for the Government of the United States of America for governmental purposes without the payment of any royalties thereon or therefor.

BACKGROUND OF THE INVENTION

1. Field of the Invention

This invention relates to an alert or alarm system for determining the location of a ground based beacon or transmitter relative to a central surface location at a short time after activation of the beacon by means of an orbiting antenna which has scanning capabilities.

In particular, the purpose of this system is to provide a means of determining the position of ground based beacons relative to a central location within seconds after activation of the beacon. Thus, rapid location of vehicles in distress such as ships at sea, auto wrecks, airplane crashes, or any other basic alarm function can be quickly located.

2. Description of the Prior Art

Prior proposals for this type of alarm have involved complex and large electronic systems fixed to ground locations at close spacings. Over a large area, this is not practical and it fails to cover situations over a body of water. Prior art patents include U.S. Pat. No. 3,048,839 which discloses the use of a surveyor transceiver unit which provides bearing and range data relative to locator stations. In U.S. Pat. No. 3,678,387, a satellite two-way communications system used a phase array antenna. In U.S. Pat. No. 3,483,561, a direction finding system is disclosed which uses plural circularly arranged antenna elements and a phase shifter. A doppler system is disclosed in U.S. Pat. No. 3,254,341 for calculating the coordinates of a point on the earth's surface wherein a satellite's radiated signals are received by a vehicle on the earth's surface from which the vehicles position may be computed. In U.S. Pat. No. 3,541,553, a satellite in a satellite communications system is placed in synchronous orbit and transmits an irregularly shaped beam by means of a plurality of antennas.

None of these systems for determining locations has the simplicity or accuracy provided by the present invention. In the present invention, a ground based beacon is located by a geosynchronous satellite within two kilometers on the surface of the earth with the total search area being about the size of the continental United States. In the present system, there is a ninety percent probability of detection within ten seconds after turn-on of the ground beacon.

SUMMARY OF THE INVENTION

The communications system of the present invention includes ground beacons for transmitting signals, orbital antenna means with scanning capabilities, and associated ground processing stations.

The ground beacons are small and inexpensive and include means for generating a coded frequency signal. The orbital antenna means is designed to have a very narrow beamwidth and the beam is swept with a known pattern. In this way, the energy from the ground beacon is received only for the duration of time that the beam intersects the ground beacon. Thus, the scan is for the purpose of detecting the presence or absence of a beacon signal and by knowledge of angular position of the beam, the location of beacon is easily determined. The antenna means includes individual modules which only receive signals and the modules are electronically steered to provide the scanning beam.

DESCRIPTION OF THE DRAWINGS

Reference to the drawing will further explain the invention wherein like numerals refer to like parts, and in which:

FIG. 1 is a schematic representation of a celestial body and an orbital antenna means;

FIG. 2 is a schematic view to illustrate the concept of scanning an area;

FIGS. 4 and 5 are views of a space vehicle and antennas in contracted and expanded positions;

DESCRIPTION OF THE PREFERRED EMBODIMENT

Figure 3:
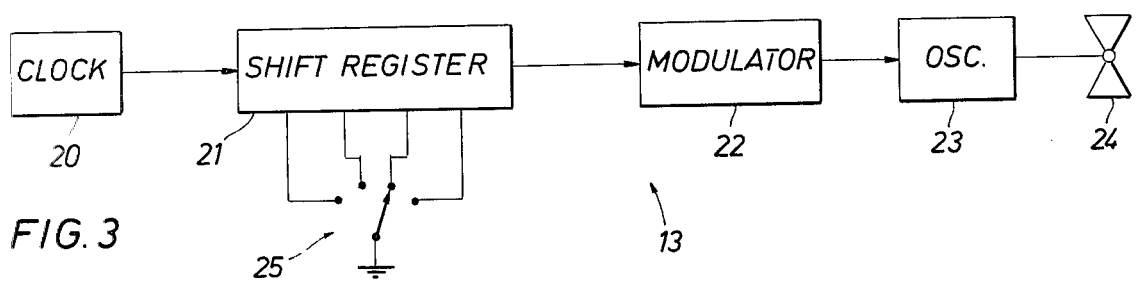
FIG. 3 is a schematic representation of electronics for a ground beacon.

Referring now to FIG. 1, the earth sphere 10 which is schematically illustrated, has an angular velocity $w_1$ about its rotational axis 18. At a distance R from the earth 10, an antenna 11 embodying the present invention orbits about the center of the earth 10 with an angular velocity $w_2$. The distance R is 36,183 km., which is the synchronous altitude where the antenna 11 moves about the earth rotational axis 18 and maintains a fixed positional relationship relative to the earth's surface such as the area designated by the numeral 12.

Assuming for the purpose of illustration that area 12 is the continental United States, it has an area roughly 5,000 km. by 3200 km. As shown in FIG. 2, the antenna 11 is provided with means for repetitively scanning the area with a linear sweep similar to a TV operation. During the sweep the antenna 11 is receptive to any signals emitted by a surface located beacon. For example, a beacon 13 which is schematically illustrated at a surface location on the area 12 can be detected by an energy scanning beam represented by the line or ray 14 when the line intersects the beacon 13. At this point in time signals from the beacon 13 are detected and transmitted to the ground control means 15. The angular position of the line 14 to the area 12 is transmitted continuously to a ground control means 15 and whenever the beacon 13 lies within the coverage of the beam 14, yields the coordinates of the beacon 13. The ground control means 15 is a conventional tracking and receiving means and is schematically illustrated in FIG. 2.

Certain parameters of the antenna system 11 can be defined in the following manner. Considering first if the accuracy for determination of a beacon position is 2 km. and if it is desired to scan each element of the area at least once every ten seconds, then the horizontal line rate ($L_r$) would be $$L_R = 3200/2 \times (0.1) = 160 \text{ lines/sec.} \quad (1)$$

The angular sweep rate ($\alpha$) for the synchronous altitude R and a line length of 5000 km. is $$\alpha = 5000/36{,}183 \times 160 = 22.1 \text{ rad./sec.} \tag{2}$$

The centroid of the received energy at the antenna 11 is determined with an accuracy of 3 $\sigma$ which is equal to the ½ power points of the energy relative to time. The energy or signal power ($P_S$) as a function of time is equal to the antenna pattern function ($A_E$) of gain times the boresight angle rate. Thus, the accuracy of 3 $\sigma$ is equal to 3 db of the antenna beam width. A beam width of 3 db for 2 km. on the earth's surface subtends to $5.5 \times 10^{-5}$ radians at the synchronous altitude.

From the foregoing and the approximation $$D = 0.89\lambda/B \tag{3}$$

where
 $D$ is the effective aperture diameter of the antenna;
 $\lambda$ is the wavelength; and
 $B$ is the beam width.

The aperture diameter of the antenna as a function of wavelength becomes $$D = \frac{0.89}{5.5 \times 10^{-5}} \lambda = 16181 \, \lambda \text{ meters} \tag{4}$$

The limiting factors which can be considered are the near field restriction and the available transmitting technology. The near field restriction is defined by those ranges (R) less than $$R < 2D^2/\lambda \tag{5}$$

Rearranging equation (5) and solving for $D_{(max)}$ at synchronous altitude $$D_{(max)} = \sqrt{\frac{36{,}183 \text{ km.} \, \lambda}{2}} \tag{6}$$

The $D_{(max)}$ values and the $D$ values as a function of frequency can be plotted and the upper boundary on the wavelength is about 0.06 meters or 5 GH$_z$.

With respect to the ground beacons, the limit on the capability for resolving the separate beacons is defined by the relationship $$\beta = 1.22\lambda/D \tag{7}$$

where
 $\beta$ equals the angular resolution in radians.

The transmitting technology is limited to transmission of up to 30 GH$_z$ at the present time and limits the peak pulse power to about 10 watts. These limits will be used as design criteria in the explanation to follow.

At the antenna, its required aperture as based on a signal to noise ratio, can be calculated with consideration of space or spreading loss and system noise power.

The space loss ($S_l$) has attenuation characteristics defined by the relationship $$S_l = 87.3 + 20 \text{ Log } R - 20 \text{ Log } \lambda \tag{8}$$

while the system noise power ($N_p$) is defined by the relationship $$N_p = KTB \, N_f \tag{9}$$

where $K$ is Boltzmann's constant,
$T$ is 290° Kelvin,
$B$ is the IF noise bandwidth, and
$N_f$ is the noise figure.

The received signal to noise ratio (S/N) can then be defined as $$S/N = P_t + G_t - S_l - KT - N_f - B - L_t - L_r - L_p + G_r \tag{10}$$

where
 $P_t$ = transmitter power in db
 $G_t$ = transmit antenna gains
 $S_l$ = space loss in db
 $L_t$ = transmit line loss
 $L_r$ = receive line loss
 $L_p$ = polarization loss
 $G_r$ = receive antenna gain Assuming typical values as follows:

| | | | |
|---|---|---|---|
| S/N = | 6 db | $L_t$ = | 1 db |
| $P_t$ = | 10 dbw | $L_r$ = | 1 db |
| $G_t$ = | 6 db | $L_p$ = | 3 db |
| $N_f$ = | 6 db | $S_l$ = | 87.3 - 20 log $\lambda$ | then the equation for the required receiving antenna gain as a function of wavelength is $$G_r = -30 + B - 20 \log \lambda \tag{11}$$

Considering a uniform square array with a spacing of 0.5 $\lambda$ the gain would be $$G_r = 2D^2/\lambda \tag{12}$$

where $D$ is the length of one side. The gain in db would be equal to $$G_r = 6 + 20 \log D - 20 \log \lambda \tag{13}$$

Equating the right side of equation (11) and (13) gives $$20 \log D = B - 36 \tag{14}$$

Using a calculated bandwidth of 3.5 MH$_z$, the required effective diameter $D$ is $$D = 29.6 \text{ meters} \tag{15}$$

The foregoing criteria are set forth to define the design parameters for a passive orbital antenna array 11 which defines a narrow beam width and can receive signals transmitted from a surface or ground based beacon 13.

The surface beacon 13, as shown in FIG. 3, includes a clock oscillator 20 for generating a clocking signal, a shift register 21 for generating different codes, a modulator 22, an oscillator 23 and a strip line antenna 24 for transmission. The codes generated can be simple NRZ binary codes which are amplitude modulated into the carrier frequency signal. The clock 20 operates the four-bit shift register which supplies a coded signal to the modulator 22. A code switch 25 selects the desired code for identification purposes from the beacon 13. The oscillator 23 includes a semi-conductor of either Avalanche or Bulk devices which oscillate when mounted in an appropriate tuned cavity or stripline and the proper D.C. voltage is applied. The modulation is accomplished by interrupting the supply voltage. Thus, the described ground beacon is simple, small and cheap.

Referring now to FIGS. 4 and 5, an antenna system is schematically illustrated with four separate array panels 30, 31, 32 and 33 which are hinged at 34 to a nose section 35 of a space craft or vehicle. The array panels are generally rectangular and curved about the lengthwise dimension for conformance to the body of the assembly. When in orbit, the panels are extended as shown in FIG. 5 to a cross configuration. As will be explained hereafter, each of the panels 30–33 can provide a separate searching beam 14.

Figure 6:
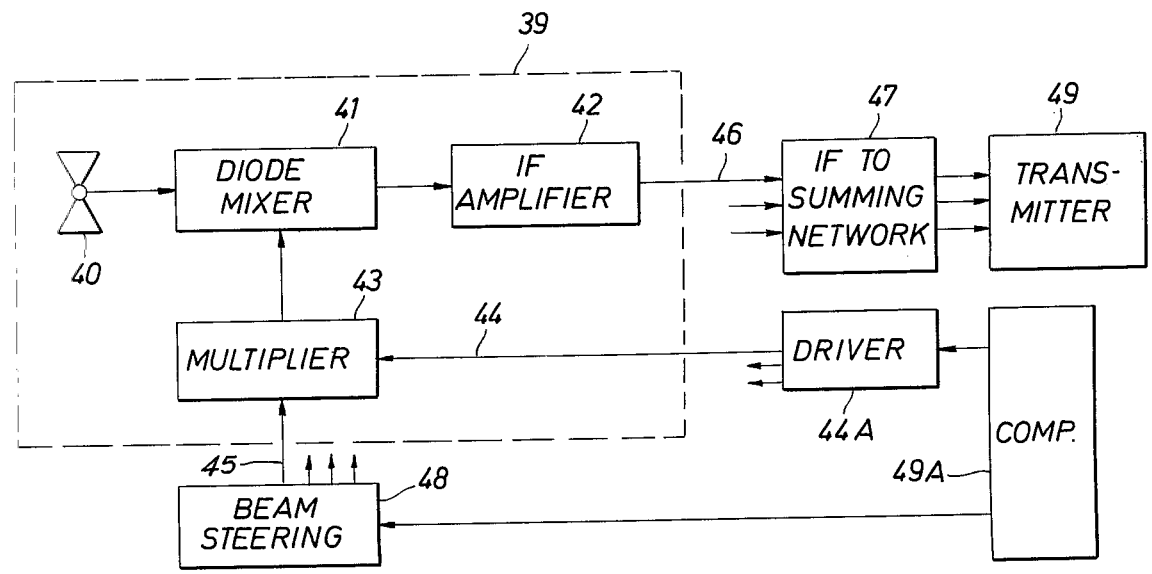
FIG. 6 is a schematic representation of the electronics for a module of the antenna receiver.

Each antenna panel 30–33 includes a matrix configuration of individual modules. An individual module 39 is illustrated in FIG. 6 which includes a strip line antenna 40, a diode mixer 41, an IF amplifier 42, and a low frequency multiplier 43. The multiplier 43 receives a driver signal input 44 from driver means 44a and a beam steering input 45 from a scanner driver means 48 in a conventional manner. The receiver driver signal 44 supplied to all of the modules in an antenna array, in effect, focusses electronically the receiver beam, and the beam steering means 48 effectively provides the scanning function of the antenna. The signal output 46 from the IF amplifier in response to a beacon signal is supplied to an IF summing network 47 along with the inputs from other modules. Thus, the energy from each of the modules is contributive.

Each antenna panel 30–33 is electrically connected to the modules 39 of the other antenna panels. The beam 14 is programmed by computer 49a operating the driver 44a and steering means 48 to scan the area 12, for example, at an angular sweep rate of 22.1 rad./sec. An antenna panel 30–33 thus is designed to have a very narrow beam width as described heretofore and the beam 14 is swept with a known pattern so that energy from a ground beacon 13 is received only for the duration of the time that the beam 14 intersects the target beacon 13. Thus location of the target beacon 13 is reduced to the presence of a target beacon 13 signal and a knowledge of the position of the beam 14. The sweeping of the beam 14 is accomplished in a well-known manner by the electronic circuitry in the space craft and the beam 14 position is transmitted by transmitter means 49 in a well-known manner to a ground tracking station 15.

The accuracy as which the location of a ground beacon 13 can be determined is primarily determined by the maximum dimension of the aperture and the total array area or gain is determined by the bandwidth and transmitter power. Reduction of weight of the antenna means 11 can be accomplished by use of multiple beams 14 which are swept simultaneously across separate sectors of the search area 12. Since the bandwidth is directly related to the search area and search time, the total bandwidth can be subdivided into channels with corresponding reduction in channel bandwidth. Thus, in the foregoing illustration, if the search area 12 is subdivided into four areas, four beams can simultaneously survey an area and the weight will be reduced by a factor of four.

Figure 7:
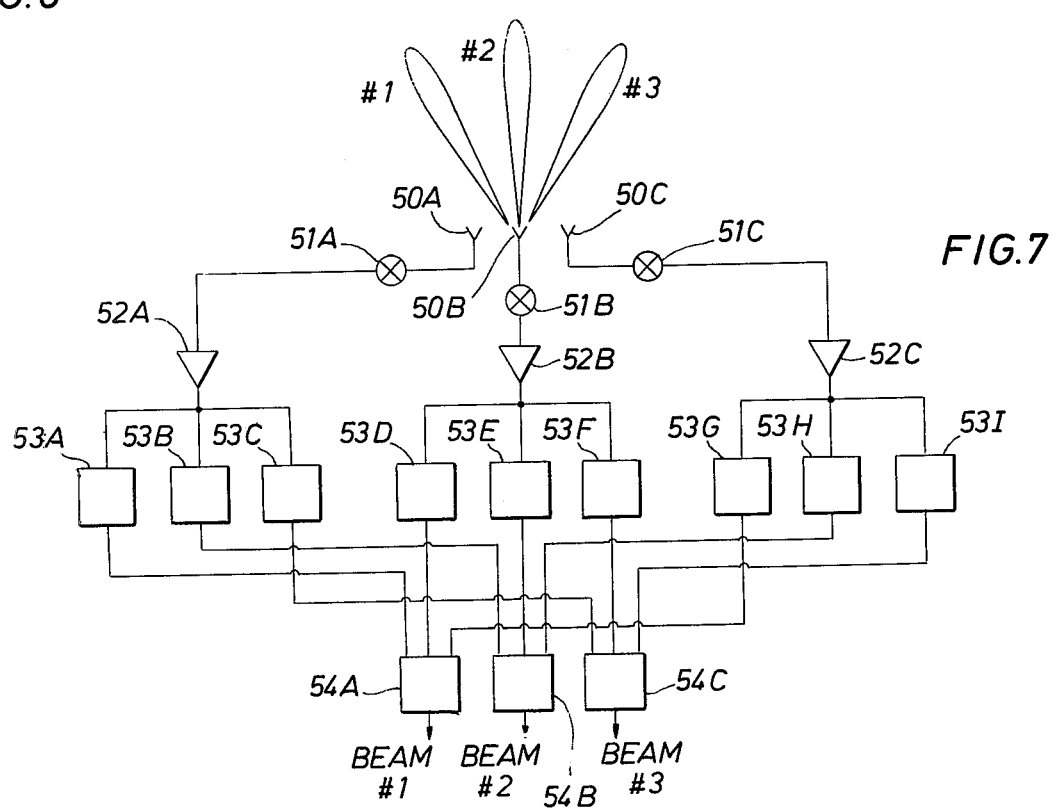
FIG. 7 is a schematic representation of the electronics for a multiple beam scanning system.

Referring to FIG. 7, modules 50a, 50b, 50c of an antenna 11 are respectively connected to mixers 51a, 51b, 51c where the received signals are mixed with a local oscillator signal. The mixed signals are respectively supplied to IF amplifiers 52a, 52b, and 52c. The output of each amplifier 52(a–c) is subdivided by phase delay and shift means 53(a–i) into a number of phase related signals $\phi_1$, $\phi_2$ and $\phi_3$. The common $\phi_1$ signals from delay means 53a, 53d and 53g are summed as beam No. 1 in a summing network 54a, the common $\phi_2$ signals from delay means 53b, 53e and 53h are summed as beam 2 in a summing network 54b, and the common $\phi_3$ signals from delay means 53c, 53f and 53i are summed as beam No. 3 in a scanning network 54c. All of the beams are swept in synchronism using beam steering signals. Thus, it will be appreciated that multiple beams can be obtained in the same array.

While particular embodiments of the present invention have been shown and described, it is apparent that changes and modifications may be made without departing from this invention in its broader aspects; and therefore, the aim in the appended claims is to cover all such changes and modifications as fall within the true spirit and scope of this invention.

What is claimed is:

1. A method for systematically surveying an area on a celestial body for locating a radio beacon thereon comprising the steps of:
   a. placing a satellite antenna means, employing a plurality of receive-only scanning beams, in a known synchronous orbit with said celestial body, each of said scanning beams being capable of viewing and receiving radio signals from a unique portion of said area to be surveyed and wherein said scanning beams together completely cover said area to be surveyed;
   b. continuously and repetitively scanning each of said unique portions of said area to be surveyed with said plurality of scanning beams;
   c. detecting at the antenna means with one of said scanning beams, the occurrence of radiant wave energy from said radio beacon; and,
   d. determining the azimuth of said radio beacon with respect to the scanning beam which detected the energy radiated from said radio beacon.

2. A remote locating system for determining the position coordinates of a radio beacon emitting radiant energy from an unknown location within an area to be surveyed comprising:
   a. satellite antenna means, employing a plurality of receive-only scanning beams, and placed in a known synchronous orbit with said celestial body, and wherein each of said scanning beams is capable of viewing and receiving radio signals from a unique portion of said area to be surveyed and wherein said scanning beams together completely cover said area to be surveyed;
   b. means for continuously and repetitively scanning each of said unique portions of said area to be surveyed with said plurality of scanning beams;
   c. means for detecting at the antenna means with one of said scanning beams, the occurrence of radiant wave energy from said radio beacon; and,
   d. means for determining the azimuth of said radio beacon with respect to the scanning beam which detected the energy radiated from said radio beacon.

* * * * *